(12) United States Patent
Nishimura et al.

(10) Patent No.: US 7,448,204 B2
(45) Date of Patent: Nov. 11, 2008

(54) EXHAUST SYSTEM FOR AN ENGINE

(75) Inventors: Hidehiro Nishimura, Shizuoka-ken (JP); Junichi Ooba, Shizuoka-ken (JP); Osamu Takii, Shizuoka-ken (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 0 days.

(21) Appl. No.: 11/311,067

(22) Filed: Dec. 19, 2005

(65) Prior Publication Data

US 2006/0150617 A1 Jul. 13, 2006

Related U.S. Application Data

(63) Continuation of application No. PCT/JP2004/007924, filed on Jun. 7, 2004.

(30) Foreign Application Priority Data

Jun. 19, 2003 (JP) ............................. 2003-174735
Mar. 23, 2004 (JP) ............................. 2004-084603

(51) Int. Cl.
*F01N 3/00* (2006.01)

(52) U.S. Cl. ............................. 60/284; 60/289; 60/297; 60/300; 60/312

(58) Field of Classification Search ................... 60/284, 60/289, 293, 299, 300, 312

See application file for complete search history.

(56) References Cited

U.S. PATENT DOCUMENTS 3,041,149 A * 6/1962 Houdry ...................... 422/179
3,220,805 A * 11/1965 Fowler et al. ............... 422/179

(Continued)

FOREIGN PATENT DOCUMENTS

JP 53-59014 5/1978

(Continued)

OTHER PUBLICATIONS

International Search Report regarding International Application No. PCT/JP2004/007924, mailed Oct. 5, 2004.

*Primary Examiner*—Thomas Denion
*Assistant Examiner*—Diem Tran
(74) *Attorney, Agent, or Firm*—Knobbe, Martens, Olson & Bear, LLP

(57) ABSTRACT

A four-cycle engine is provided that includes an exhaust port for releasing combusted gas from the engine and an exhaust system. The exhaust system includes an exhaust pipe coupled with the exhaust port, a first catalyst, a second catalyst, and a secondary air introduction pipe. The first catalyst is disposed in the exhaust pipe and the second catalyst is disposed in the exhaust pipe a set distance downstream of the first catalyst. The secondary air introduction pipe is configured to introduce air into the exhaust pipe. The secondary air induction pipe is connected to the exhaust pipe between the first and the second catalysts at a location where a temperature difference of the first and the second catalysts in a cold start transient phase is within a predetermined range.

28 Claims, 10 Drawing Sheets

U.S. PATENT DOCUMENTS

| | | | |
|---|---|---|---|
| 3,402,550 A * | 9/1968 | Behrens | 60/292 |
| 4,125,997 A * | 11/1978 | Abthoff et al. | 60/289 |
| 4,653,270 A | 3/1987 | Takii | |
| 4,658,795 A | 4/1987 | Kawashima et al. | |
| 4,766,866 A | 8/1988 | Takii et al. | |
| 4,809,647 A | 3/1989 | Masumoto et al. | |
| 5,048,471 A | 9/1991 | Takii et al. | |
| 5,285,639 A * | 2/1994 | Araki et al. | 60/274 |
| 5,365,908 A | 11/1994 | Takii et al. | |
| 5,443,547 A * | 8/1995 | Morikawa | 60/274 |
| 5,746,049 A * | 5/1998 | Cullen et al. | 60/274 |
| 5,746,173 A | 5/1998 | Takii et al. | |
| 5,804,147 A * | 9/1998 | Blanchet et al. | 422/172 |
| 5,814,283 A | 9/1998 | Matuoka et al. | |
| 5,822,976 A * | 10/1998 | Cockerill | 60/274 |
| 5,961,294 A | 10/1999 | Hataura et al. | |
| 6,000,217 A * | 12/1999 | Hochmuth | 60/274 |
| 6,250,281 B1 | 6/2001 | Takii et al. | |
| 6,523,342 B2 * | 2/2003 | Kuper et al. | 60/274 |
| 2001/0010804 A1 | 8/2001 | Majima | |

FOREIGN PATENT DOCUMENTS

| | | |
|---|---|---|
| JP | 09-133016 | 5/1997 |
| JP | 2001-173437 | 6/2001 |

* cited by examiner

EXHAUST SYSTEM FOR AN ENGINE

CROSS-REFERENCE TO RELATED APPLICATIONS

This application is a continuation of PCT application PCT/JP2004/007924, filed Jun. 7, 2004, which claimed the priority benefit of Japanese Patent Application 2003-174735, filed Jun. 19, 2003 and Japanese Patent Application 2004-084603, filed Mar. 23, 2004, each of which is hereby incorporated by reference in its entirety.

BACKGROUND OF THE INVENTION

1. Field of the Invention

This application relates to an exhaust system with an exhaust gas purifier. More particularly, this application relates to a four-cycle engine with such an exhaust system.

2. Description of the Related Art

FIG. 1 shows that the composition of exhaust gas emitted by a four-cycle engine is dependent on the composition of the combustion gas burned by the engine. More particularly, when the air fuel (A/F) ratio varies, the composition of exhaust gas also varies. In this example, as the A/F ratio becomes richer than 14.6, the amount of CO and THC emitted rapidly increase and as the A/F ratio becomes leaner, the amount of CO and THC emitted decreases at a relatively low rate. This type of threshold value is sometimes referred to herein as a theoretical air fuel ratio or stoichiometric ratio. In some cases, some exhaust gas components exhibit a counter trend to that of the CO and THC. For example, emission of NOx increases for leaner A/F ratios and decreases when the A/F ratio is richer.

Two techniques are known for reducing or otherwise controlling the concentration of certain uncombusted elements in exhaust gas. Such techniques and systems deploying them are sometimes referred to as exhaust gas purifying techniques or exhaust gas purifiers. FIGS. 2 and 3 illustrate an engine equipped with an exhaust gas purifier for reducing CO, HC, and NOx in the exhaust gas of the engine. The engine includes a three-way catalyst 31 located in the middle of an exhaust pipe 30. An oxygen sensor 32 is positioned on an upstream side (relative to the flow of exhaust gas in the exhaust pipe 30) of the three-way catalyst 31 to measure the concentration of oxygen in the exhaust gas. The measured oxygen concentration is used to estimate the engine's A/F ratio and to calculate an amount of fuel to be mixed with the air and provided to the engine such that the A/F ratio is kept close to the theoretical A/F ratio (e.g., 14.6), whereby emissions of CO, HC, and NOx are limited as shown in FIG. 3.

The oxygen concentration feedback technique described above maintains a desirable A/F ratio for removing CO, HC, and NOx from the exhaust gas, but disadvantageously limits engine power. Consequently, an operator of a motorcycle or other vehicle with a small displacement engine using this exhaust gas purifying technique may be dissatisfied with the vehicle's power. Also, this exhaust gas purifying technique generally requires the use of a fuel injection system, including a fuel pump, a fuel regulator, a controller, and the like, to control the A/F ratio. These components are required because, as shown in FIG. 3, if the A/F ratio varies from the theoretical A/R ratios by more than a very small amount, the emission of at least one component of exhaust gas to be controlled will greatly increase. These components increase the cost and complexity of the engine.

A second known exhaust gas purification system is illustrated in FIGS. 4 and 5. The engine includes first and second catalysts 35 and 36 in an exhaust pipe 30A, with the second catalyst 36 being downstream (relative to the flow of exhaust gas in the exhaust pipe 30A) of the first catalyst 35. A secondary air induction pipe 37 introduces air that has not burned in the engine (referred to herein as "secondary air") into the exhaust pipe 30A between the first and second catalysts 35, 36. In this system, the first catalyst 35 reduces NOx in the exhaust gas emitted from the exhaust pipe 30A and the second catalyst 36 oxidizes, and thereby reduces, CO and HC in the exhaust gas emitted from the exhaust pipe downstream of the first catalyst.

The exhaust gas purifier of FIG. 4 allows the A/F ratio of the combustion gas burned in the engine to be richer than the theoretical A/F ratio because the secondary air introduced upstream of the second catalyst 36 enhances the oxidization therein of CO and THC. FIG. 5 shows that the A/F ratio of the engine is significantly richer than the theoretical A/F ratio, but the second catalyst oxidizes CO and THC as if the engine combusted a leaner A/F ratio, near the theoretical A/F ratio. A richer A/F ratio enhances the power of the vehicle compared to exhaust gas purifier of FIG. 2. If the engine is a small displacement engine, the vehicle equipped with exhaust gas purifier of FIG. 4 will be more responsive to the operator, and thus more enjoyable to ride. Also, the exhaust gas purifier of FIG. 4 can operate with a conventional carburetor.

SUMMARY OF THE INVENTION

However, introduction of secondary air into the exhaust pipe in the conventional engine may reduce the usable life of the catalysts. In some cases, the location of the introduction secondary air is a factor that affects the usable life or durability of the catalyst. In some cases, elevated or excessive temperatures affect the life of a catalyst. For example, if the catalysts are excessively heated by the introduction of the secondary air, the catalysts can deteriorate, reducing the usable life thereof. Also, deterioration of the catalyst can occur more quickly if the high temperature state persists for a long time.

The performance of an exhaust gas purifier also can be hindered in cold operating conditions by introduction of secondary air. For example, activation of at least the downstream catalyst responsible for oxidizing and removing the CO and HC from the exhaust gas emitted to the environment is delayed in cold operating conditions if the secondary air is cold, reducing the temperature of the exhaust gas, which is the primary source of heat to activate the downstream catalyst. Accordingly, the removal of CO and HC by the downstream catalyst is less than optimal in this situation.

This application describes ways to address the shortcomings of the exhaust gas purifiers, e.g., those discussed in the Related Art described above. The inventors have discovered techniques for controlling, e.g., delaying, the deterioration of catalysts in exhaust gas purifiers. In one mode, an exhaust system which is configured to prolong the life of at least one catalyst in an exhaust gas purifier in which secondary air is introduced into an exhaust conduit between two catalysts. The engine also preferably facilitates activation of the catalysts when the engine is cold or is being operated in a cold environment.

In exhaust gas purifiers where multiple catalysts are used, each of the catalysts contribute a portion of the purification of the exhaust gas, or exhaust gas purification burden. The inventors have found that in some cases when a post-activation temperature difference between two adjacent catalysts increases, one of the two catalysts carries more of the purification burden than the other catalyst. As a result, the catalyst carrying the greater burden may deteriorate more quickly. The inventors also found that deterioration of the catalyst in a multiple catalyst system can be controlled by controlling the activation temperature of the catalysts. For example, in one mode, the location of the introduction of secondary air into the exhaust pipe can be selected such that the temperature difference after activation of a first and a second catalysts is controlled, e.g., is within an acceptable range, which can be a predetermined value or range of values in some modes.

In one mode, an engine system is provided that includes an exhaust port for releasing combusted gas from an engine and an exhaust system. The exhaust system includes an exhaust pipe coupled with the exhaust port, a first catalyst, a second catalyst, and a secondary air introduction pipe. The first catalyst is disposed in the exhaust pipe and the second catalyst is disposed in the exhaust pipe a set distance downstream of the first catalyst. The secondary air introduction pipe is configured to introduce air into the exhaust pipe. The secondary air induction pipe is connected to the exhaust pipe between the first and the second catalysts at a location where a temperature difference between the first and the second catalysts in a cold start transient phase is within a predetermined range.

Here, the "cold start transient phase" means an operation period, mode, or area from when the engine is started in a cold state to when an activation temperature (e.g., 300° C.) of at least one of the first and the second catalysts is reached. In some cases, the cold start transient phase, which is also sometimes referred to herein as "a start-up period," extends until the temperature of at least one of the catalyst temperatures stabilizes. In some cases, the start-up period extends for a set time period, e.g., is a function of time only.

In one technique described in more detail below, the cold start transient phase extends from between about 1000 to about 1200 seconds after an engine cold start. In one technique described further below, a temperature difference is considered "within a predetermined range" when the temperature difference is about 100° C. or less. The "predetermined range" can vary based on a number of factors, such as the heat transfer properties of the catalysts, the preferred usable life, and other factors. The predetermined range can be a numerical value or range of values that are known prior to the operation of the engine or can be a range or value calculated by an equation that is know or predetermined.

In another mode, an engine system is provided that includes an exhaust port for releasing combusted gas from an engine and an exhaust system. The exhaust system guides exhaust pulsations. The exhaust system includes an exhaust pipe coupled to the exhaust port, a first catalysts catalyst arranged in the exhaust pipe, a second catalyst, and a secondary air introduction pipe. The second catalyst arranged in the exhaust pipe a set distance downstream of the first catalyst. The secondary air induction pipe introduces secondary air into the exhaust pipe. The secondary air introduction pipe is connected to the exhaust pipe between the first and the second catalysts at a position where the first catalyst interacts with at least a portion of the secondary air due to the exhaust pulsation.

BRIEF DESCRIPTION OF THE DRAWINGS

These and other features, aspects and advantages of the present invention will now be described in connection with preferred embodiments of the invention, in reference to the accompanying drawings. The illustrated embodiments, however, are merely examples and are not intended to limit the invention. The following are brief descriptions of the drawings.

DETAILED DESCRIPTION OF THE PREFERRED EMBODIMENT

Embodiments of the present invention will be hereinafter described in connection with the attached drawings.

Figure 1:
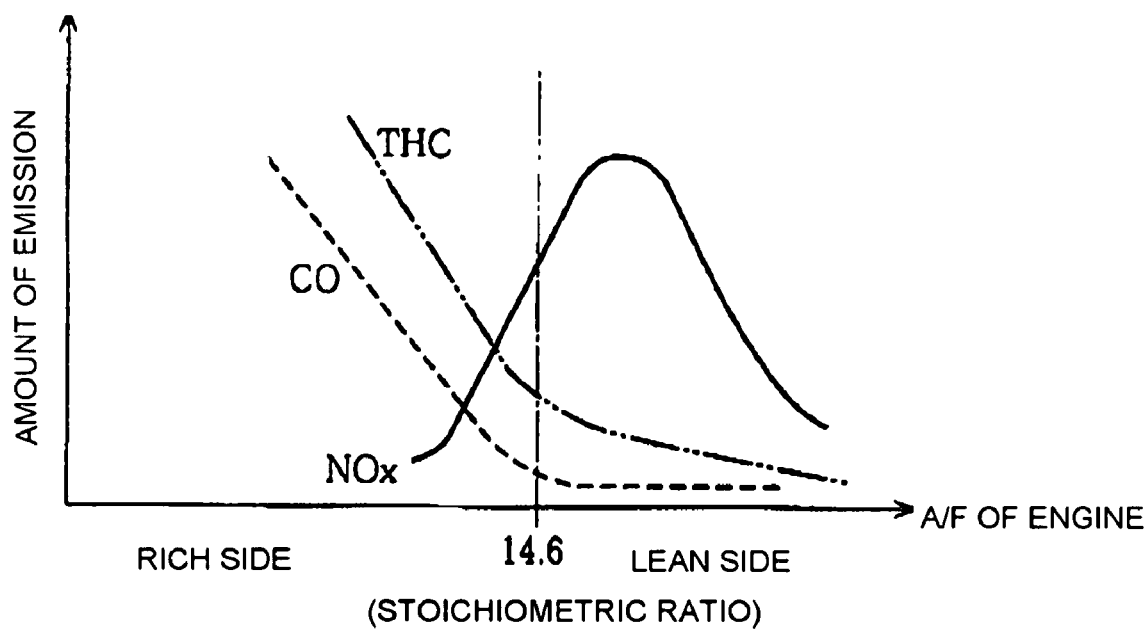
FIG. 1 is a characteristic chart that shows a relationship between values of air fuel ratio and values of emission amounts for certain constituents of exhaust gas of a four-cycle engine.
Figure 2:
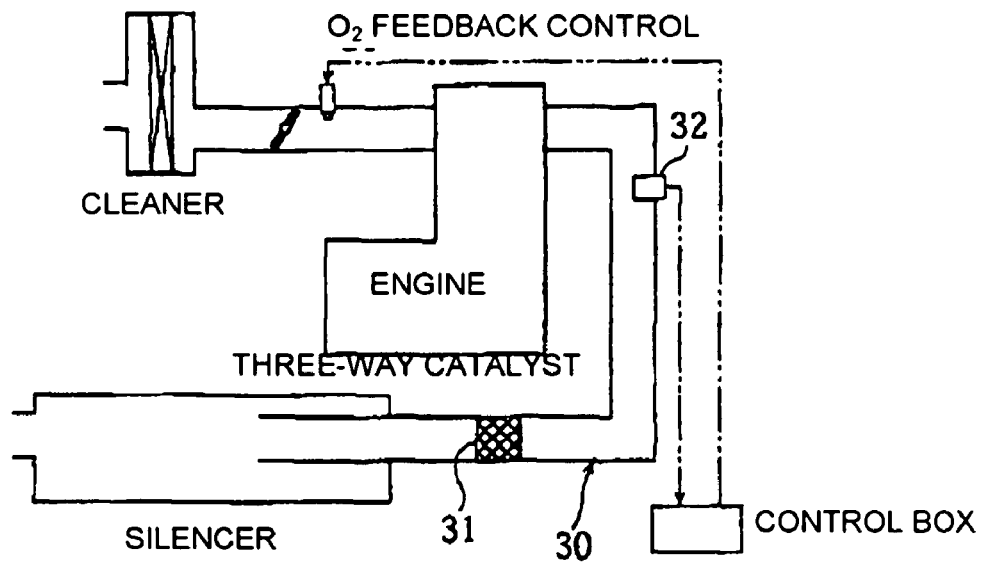
FIG. 2 is a schematic diagram of a four-cycle engine equipped with a conventional exhaust gas purifier that uses oxygen measurement to feedback control A/F ratio.
Figure 3:
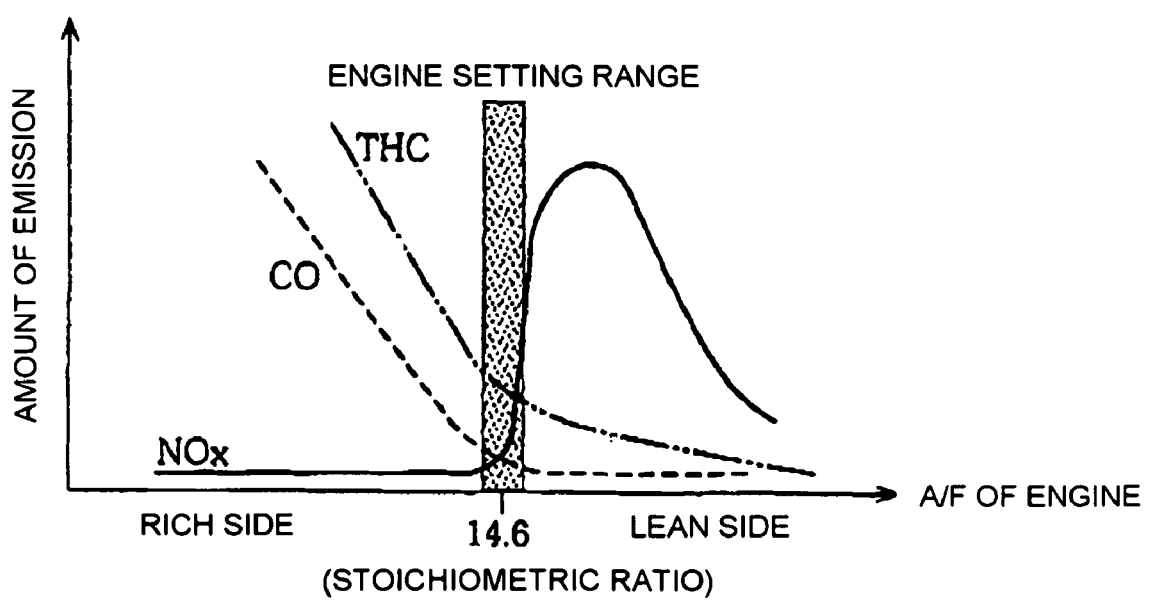
FIG. 3 is a characteristic chart of the exhaust gas purifier of FIG. 2.
Figure 4:
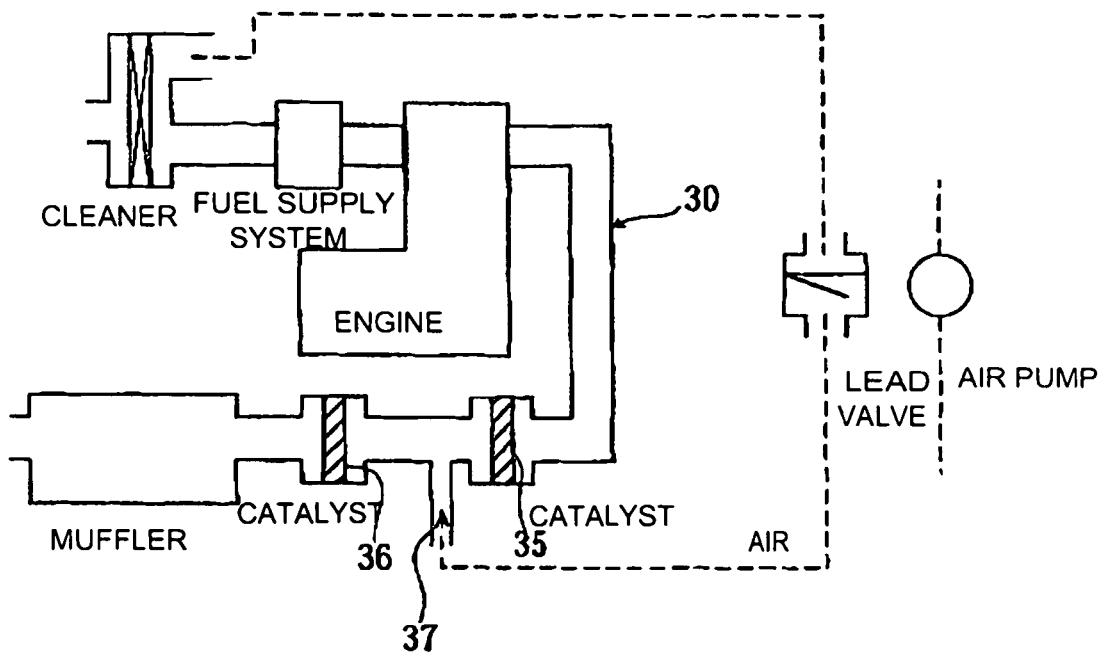
FIG. 4 is a schematic diagram of another conventional exhaust gas purifier that uses first and second catalysts and secondary air.
Figure 5:
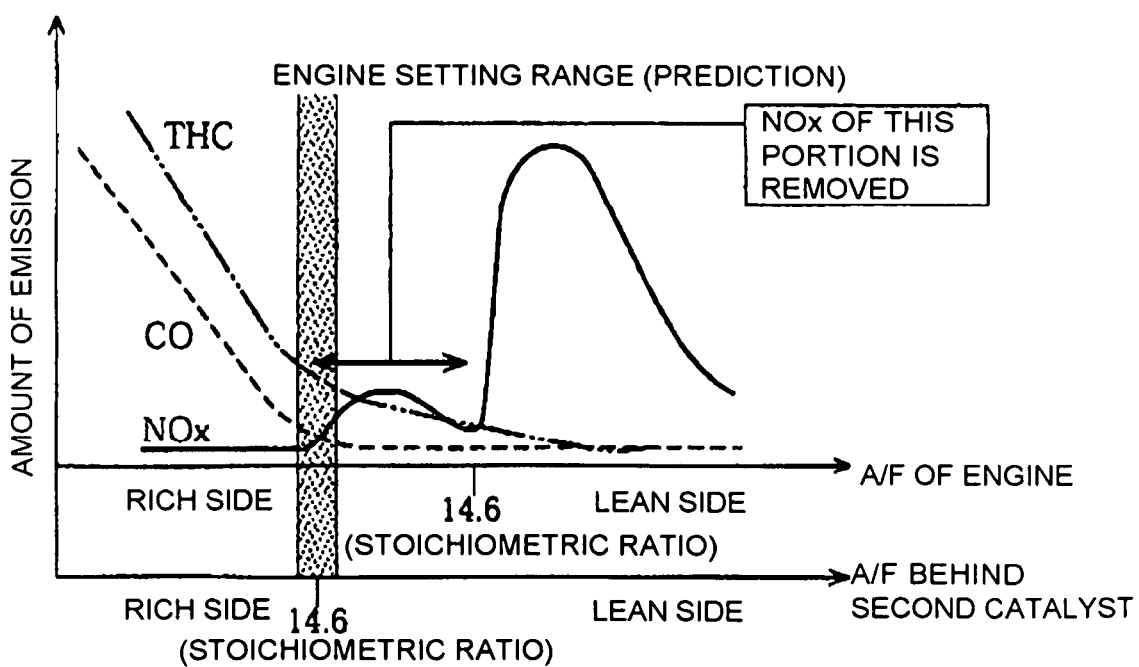
FIG. 5 is a characteristic chart of the exhaust gas purifier of FIG. 4.
Figure 6:
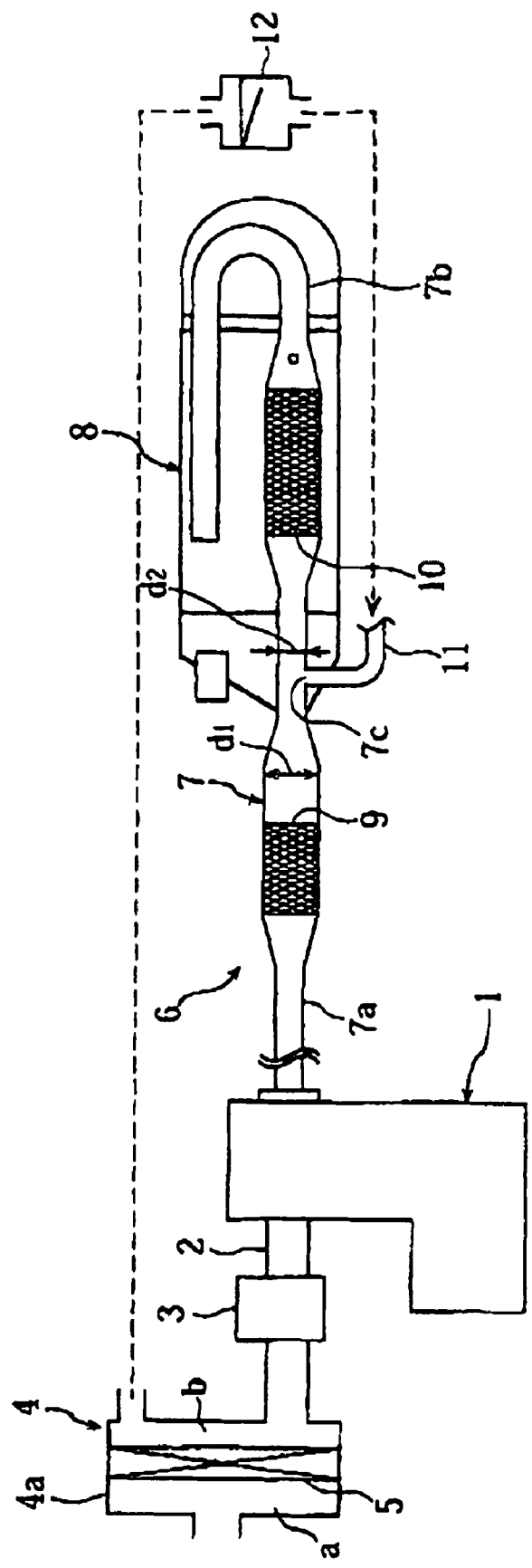
FIG. 6 is a schematic diagram of a four-cycle engine equipped with one embodiment of an exhaust gas purifier as described further below.

With reference to FIG. 6, one embodiment of a four-cycle engine 1 is shown, which engine can be adapted for use in a two wheel motorized vehicle, such as a motorcycle or a scooter, or any other vehicle, such as one that can be driven by a small displacement engine.

An intake passage 2 is connected to an intake port (not shown) of the engine 1 to conduct a mixture of air and fuel (e.g., combustion gas) to the intake port. A carburetor 3 serving as a fuel supply system is disposed in the intake passage 2 to regulate the mixture of air and fuel. An air cleaner 4 connected to an upstream end of the intake passage 2 filters the air to remove debris and/or contaminants therefrom. This air cleaner 4 has a cleaner case 4a within which an air suction side "a" and an air emission side "b" are defined. An element 5 separates the air suction side "a" form the air emission side "b". The element 5 is a filter in some embodiments and is a baffle in other embodiments.

In one arrangement, the carburetor 3 includes a slow speed system, which operates when the engine 1 is idling or is propelling a vehicle with which it is associated at low-speed. The carburetor 3 preferably also includes a main system, which operates when the engine 1 is propelling the vehicle with which it is associated at medium or high speed. In some operational modes, the carburetor 3 outputs an A/F ratio that is richer than a theoretical A/F ratio.

An exhaust gas purification system 6 is connected to an exhaust port (not shown) of the engine 1. This exhaust gas purification system 6 includes an exhaust pipe 7, which is connected to the exhaust port, and a muffler 8, which is disposed on downstream portion of the exhaust pipe 7. The exhaust pipe 7 has an upstream portion 7a, a downstream portion 7b, and secondary air induction port 7c. In one arrangement, the downstream portion 7b has a U-shape construction. The U-shape construction can be provided by bending the downstream portion 7b or by forming the downstream portion in a U-shape. The manner of forming to be used can relate to the materials being used. For example, bending is a suitable forming technique for some metals of which the downstream portion 7b can be comprised. The U-shape of the downstream portion is advantageous in that it increases the effective length of the exhaust pipe 7 while maintaining a compact arrangement. The downstream portion 7b can take other compact configurations that effectively lengthen the exhaust pipe 7. In one arrangement discussed further below, the downstream portion 7b is at least partially housed in the muffler 8.

In one embodiment, the exhaust gas purification system 6 includes an exhaust gas purifier. The exhaust gas purifier can be configured with a first catalyst 9 and a second catalyst 10. The first catalyst 9 preferably is disposed in the upstream portion 7a of the exhaust pipe 7. The first catalyst 9 can be configured to provide a reduction action, e.g., by promoting a reduction reaction therein. The second catalyst 10 preferably is disposed in the downstream portion 7b. The second catalyst 10 preferably is located downstream of the first catalyst 9, e.g., downstream of the secondary air induction port 7c. In one embodiment, the secondary air induction port 7c is formed in the exhaust pipe 7 between the first and the second catalysts 9 and 10. The second catalyst 10 has an oxidation action in some embodiments, e.g., promoting an oxidation reaction.

In one arrangement, the exhaust pipe 7 has a cross-section that varies along its length. For example, in one arrangement, the exhaust pipe 7 has an inner diameter d1 at the location of at least one of the first and second catalysts 9, 10. The exhaust pipe 7 also can have an inner diameter d2 that is less than the diameter d1. The diameter d2 can define the cross-sectional configuration of the exhaust pipe 7 in locations other than the location of at least one of the first and second catalysts 9, 10. In one embodiment, the exhaust pipe 7 has at least one, e.g., two, enlarged portions where the first and second catalysts 9, 10 are housed.

Figure 15:
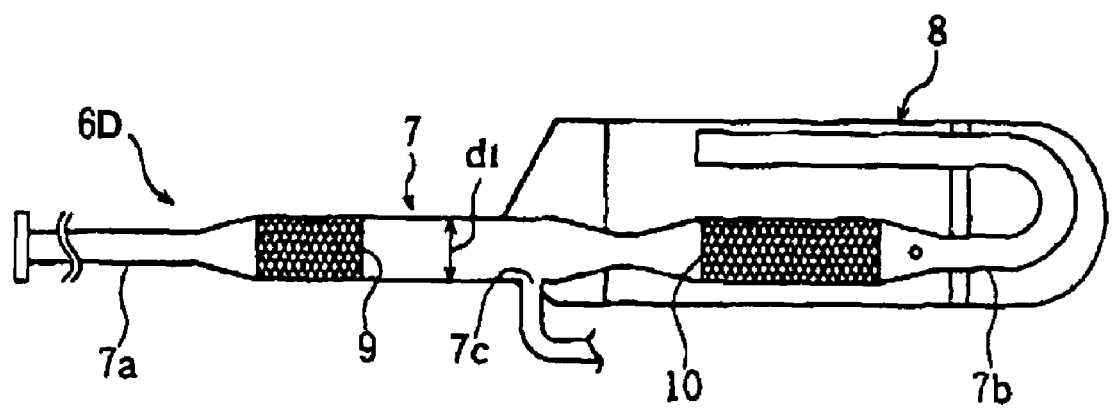
FIG. 15 is a diagram showing another embodiment of an exhaust gas purifier.

FIG. 6 shows that in one embodiment, the secondary air induction port 7c is located in a small diameter portion of the exhaust pipe 7, between the first and second catalysts 9, 10. By constricting the size of the exhaust pipe 7 upstream of the secondary air induction port 7c, the flow velocity of the exhaust gas is increased adjacent the secondary air induction port. The increased flow velocity of the exhaust gas generates a negative pressure by a Venturi effect in the induction port 7c, whereby secondary air flow into the exhaust pipe 7 can be increased. FIG. 15 shows that in another embodiment of an exhaust gas purification system 6D in which the secondary air induction port 7c can be formed in a portion of the exhaust pipe 7 where the first catalyst 9 is disposed. In this arrangement, the secondary air induction port 7c is located in a portion of the exhaust pipe 7 that is not constricted and the flow past the induction port 7c is not increased by a Venturi effect.

A secondary air supply system can be connected to the secondary air induction port 7c. This secondary air supply system has an upstream end that is in fluid communication with the emission side "b" of the air cleaner 4 and a downstream end that is in fluid communication with the secondary air intake port 7c. For example, a secondary air induction pipe 11 can be provided between the upstream and downstream ends of the secondary air supply system. In some arrangements, at least one characteristic of the flow in the secondary air induction pipe 11 is regulated a flow regulating device. For example, an appropriate flow direction or amount in the secondary air supply system can be regulated by a lead valve 12. The lead valve 12 can be interposed anywhere between the air cleaner 4 and the intake port 7c, e.g., in a middle portion of the secondary air induction pipe 11.

In some arrangements, the lead valve 12 functions as a check valve, which allows air flow from the side of the valve fluidly closest to the air cleaner 4 to the side of the valve closest to the exhaust pipe 7. The lead valve 12 can be configured to limit or prevent air flow in the opposite direction. By limiting or preventing flow in the opposite direction, the lead valve 12 reduces undesirable interactions between the air cleaner 4 and the exhaust pipe 7. For example, opening and closing of the exhaust valves (not shown) of the engine 1 can create exhaust pulsation and negative pressure in the exhaust gas purification system 6, which can cause air in the emission side "b" of the air cleaner 4 to be sucked into the secondary air induction pipe 11. Another flow regulating device, such as a pump or air compressor, could be used in place of or in combination with the lead valve 12. A pump can be used to supply air under pressure to exhaust pipe 7 through the secondary air induction pipe 11.

The secondary air induction pipe 11 is connected to an upstream portion of the downstream portion 7b of the exhaust pipe 7. In one embodiment, the secondary air induction pipe 11 is connected to the exhaust pipe at a located inside the muffler 8. In one embodiment, the secondary air induction pipe 11 is supported by and fixed to the downstream portion 7b of the exhaust pipe 7. In another embodiment, the secondary air induction pipe 11 and the downstream portion 7b of the exhaust pipe 7 are supported by and fixed to the muffler 8.

In some embodiments, the position of one or more of the first and second catalysts 9, 10 is important to proper operation of the exhaust gas purification system 6. For example, the first catalyst 9 can be configured to operate efficiently at an elevated temperature. As discussed further below, the elevated temperature, or "activation temperature," of the first catalyst 9, is reached by heat transfer from the exhaust gas and by the reaction taking place in the catalyst. Because some heat will be transferred out of the exhaust pipe 7 in the upstream portion 7a per unit length of the upstream portion, it is desirable in some cases to position the first catalyst 9 within a selected distance from the exhaust port of the engine 1. For example, in one arrangement, the first catalyst 9 is positioned where the exhaust gas entering the first catalyst is at or above a temperature of about 300°. In some embodiments, activation of the first catalyst 9 is enhanced, and therefore, the purification process is more efficient if the catalyst 9 can be heated to a temperature of about 300° C. or more. In one arrangement, for an engine with a displacement of about 50 cubic centimeters, the first catalyst 9 can be positioned within about 300 to 500 mm from an exhaust port of the engine to provide adequate activation temperatures.

In some cases, the performance of the exhaust gas purification system 6 is a function of the temperature of the second catalyst, which in turn is a function of the exhaust gas entering the second catalyst. The temperature of exhaust gas entering the second catalyst 10 is affected by several factors, including the distance from the exhaust port of the engine, heat transfer out of the exhaust gas in the first catalyst 9 and in upstream portions of the exhaust pipe 7, the temperature of the secondary air introduced through the secondary air induction port 7c, and the reaction taking place in the first catalyst. In one arrangement, the second catalyst 10 is positioned such that gas enters the second catalyst at a temperature of about 300° C. or more. In one arrangement, for an engine with a displacement of about 50 cubic centimeters, the second catalyst 10 located about 200 mm from the first catalyst 9.

Another technique for modifying or controlling the temperature of the gas in at least one of the catalysts 9, 10 is to select the location of the secondary air induction port 7c. The location of the secondary air induction port 7c affects the difference between the temperature of the exhaust gas in the first and the second catalysts 9, 10 because the secondary air promotes the reactions in the catalysts. The secondary air can increase the temperature of a catalyst upstream of the port 7c if at least some secondary air flows upstream. A flow of at least some of the secondary air upstream can be promoted by any suitable technique, such as reliance on exhaust pulsations or by providing locating the port 7c relative to (e.g., upstream of) a construction in the exhaust pipe 7. As discussed above, it is desirable in some cases to control the temperature of (or the temperature difference between) the exhaust gas entering the first catalyst 9 and the exhaust gas entering the second catalyst 10. In some cases, it is desirable to control the temperature of the first and second catalysts 9, 10 and to control the temperature difference between the catalysts.

One way to control the temperature in at least one of the first and second catalysts 9, 10 is to select the position of the secondary air induction port 7c such that a temperature difference between the first and second catalysts 9, 10 is within a predetermined range, such as within about 100° C. The temperature difference can be measured by any suitable technique or device and by any suitable metric, such as the difference between highest temperatures in the first and second catalysts 9, 10 at steady state, during a transient phase, or at any other phase or point during a variety of operational modes.

In one embodiment, a location for connecting the secondary air induction pipe 11 to the exhaust pipe 7 is selected to reduce the difference between the maximum temperatures in the first and the second catalysts 9, 10 to about 100° C. or less over a range of operational modes. In one variation, the secondary air induction port 7c is connected about mid-way between the first and the second catalysts 9, 10. In another embodiment, the secondary air induction port 7c can be located closer to the first catalyst 9 than to the second catalyst 10. The secondary air induction port 7c can be located closer to the second catalyst 10 than to the first catalyst 9 in some cases.

Selecting the position for connecting the secondary air induction pipe 11 is one technique for controlling the operating temperature difference in the first and second catalysts 9, 10. By reducing or minimizing the operating temperature difference between the catalysts, e.g., to about 100° C. or less, degradation of the first and second catalysts 9, 10 can be controlled. With some catalysts, the rate of degradation of the first and the second catalysts 9, 10 can be comparable if operated at close to the same temperature. This temperature control technique can be used to extend the life of the at least one of the catalysts 9, 10. This temperature control technique can be used to extend the life of the second catalyst 10 by at least reducing the deviation of burden due to the temperature difference of the first and the second catalysts 9, 10. The temperature control is one technique for extending the usable life of the exhaust gas system 6.

The location of the secondary air induction pipe 11 relative to the first and second catalysts 9, 10 can affect the temperature of the catalysts. For example, in one arrangement, a temperature of the catalyst to which the secondary air induction pipe 11 is closest tends to be higher than a temperature of the other catalyst. In one technique, the location of the secondary air induction pipe 11 is selected to provide temperature control for the exhaust gas purification system 6. For example, the secondary air induction pipe 11 can be connected to the exhaust pipe 7 at a position where the temperature difference between the first and the second catalysts 9 and 10 is as small as possible. In one embodiment, the secondary air induction pipe 11 can be located anywhere in a range of up to about one-half of the interval from the first catalyst 9 to the second catalyst 10. This embodiment is one technique for reducing the likelihood of a long-lasting high-temperature state in one or more of the first and second catalysts 9, 10.

In the embodiment of FIG. 6, the second catalyst 10 is disposed in the muffler 8 in which the downstream portion 7b of the exhaust pipe 7 is housed. This advantageously allows the capacity of the second catalyst 10 to be increased and the performance of the exhaust gas purification system 6 to be increased without marring the appearance of the vehicle with which it is associated.

Another advantage of locating the second catalyst 10 in the muffler 8 is that the second catalyst 10 is shielded from external air, which shielding prevents the second catalyst 10 from being cooled thereby. Accordingly, the second catalyst 10 reaches the activation temperature from a cold start of the engine 1 more quickly and the exhaust gas purification system 6 is fully operational more quickly after the cold start.

Also, in this embodiment the secondary air induction pipe 11 can be connected to the exhaust pipe 7 and the muffler 8. In one embodiment, the secondary air induction pipe 11 is connected to the downstream portion 7b, e.g., inside the muffler 8. This arrangement provides a strong connection between the secondary air induction pipe 11 and the rest of the exhaust gas purification system 6 without spoiling the appearance.

FIGS. 7-15 illustrate other embodiments and the performance thereof. These embodiments illustrate the effect of the arrangement of the components of an exhaust gas purification system on the temperature difference between two catalysts included therein. As discussed further below, the three embodiments differ in the position of the secondary air intake port 7c. In some cases, it is desirable to keep the temperature difference between the first and the second catalysts 9, 10 below an upper limit, e.g., about 100° C. or less.

The embodiments of the exhaust gas purification systems described below are similar to the system 6, except as discussed below. The discussion of the performance of each of the systems described below is derived by adjusting traveling time and traveling velocity in accordance with a traveling pattern set in advance. This data could be derived using an ECE40 test method. More specifically, a two-wheeled motorized Vehicle could be configured to repeat a traveling pattern of a fixed duration at progressively faster velocities. For example, the two-wheeled motorized vehicle could be operated to travel for 200 seconds at three progressively faster traveling velocities, e.g., about 15 km/h, about 30 km/h, and about 50 km/h. This 200 second cycle could be repeated six times so that the vehicle operates for 1200 seconds total. During the 1200 second vehicle operation, an amount of secondary air introduced could be regulated at about 370 to about 400 liters. During the period, changes in an amount of emission of CO and temperatures of the first and the second catalysts could be measured. The performance of three different embodiments if operated in the manner described above is expected to be as shown in FIG. 8(a)-8(c), 9(a)-9(c), and 10(a)-10(c).

Figure 7:
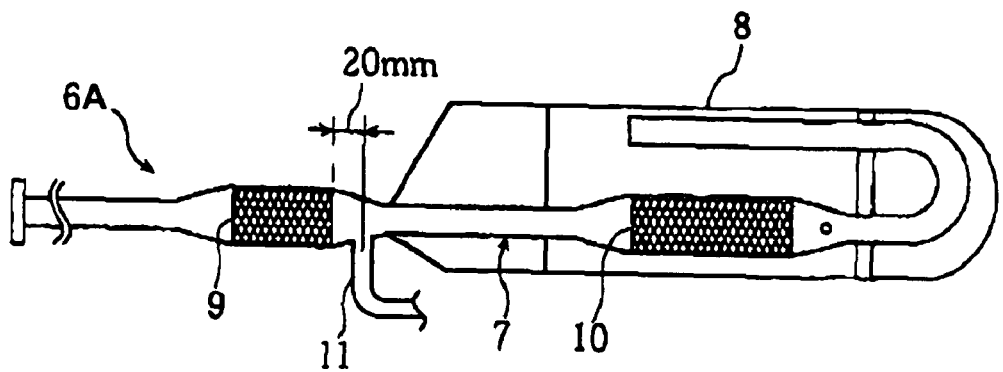
FIG. 7 is detailed view of one variation of the exhaust gas purifier shown in FIG. 6.
Figure 8:
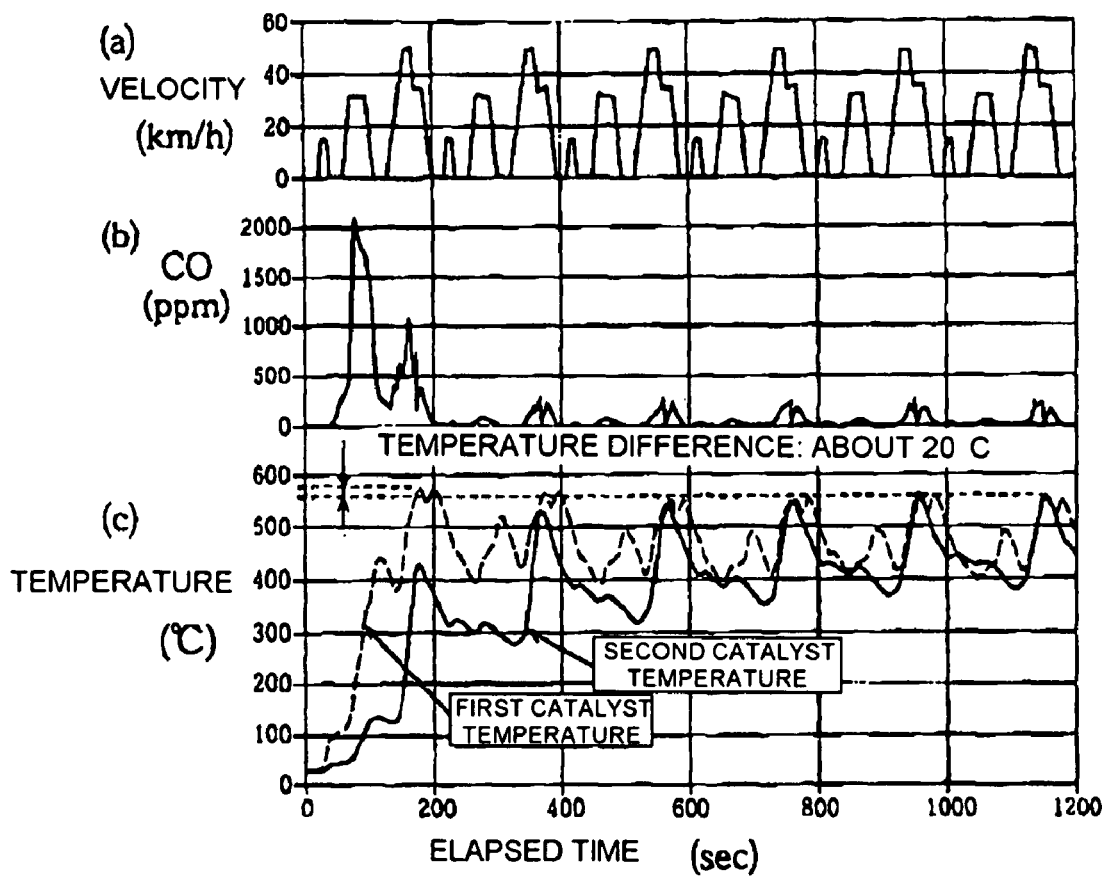
FIG. 8 is a diagram showing aspects of the performance of the exhaust gas purifier of FIG. 7.

With reference to FIG. 7, another embodiment of an exhaust gas purification system 6A introduces secondary air relatively close to the first catalyst 9. In the system 6A, the secondary air induction pipe 11 is connected to a position on the downstream side of the first catalyst 9 that is closer to the first catalyst 9 than to the second catalyst 10. In one variation, the position of the secondary air induction pipe 11 is about 20 mm from a rear end surface of first catalyst 9. In the illustrated variation, the secondary air induction pipe 11 is located in a transition zone of the exhaust pipe 7 where the transverse size of the exhaust pipe varies along its length, e.g., from the size d1 to the size d2. Also, the position of the introduction of secondary air through the secondary air induction pipe 11 is outside the muffler 8.

Figure 9:
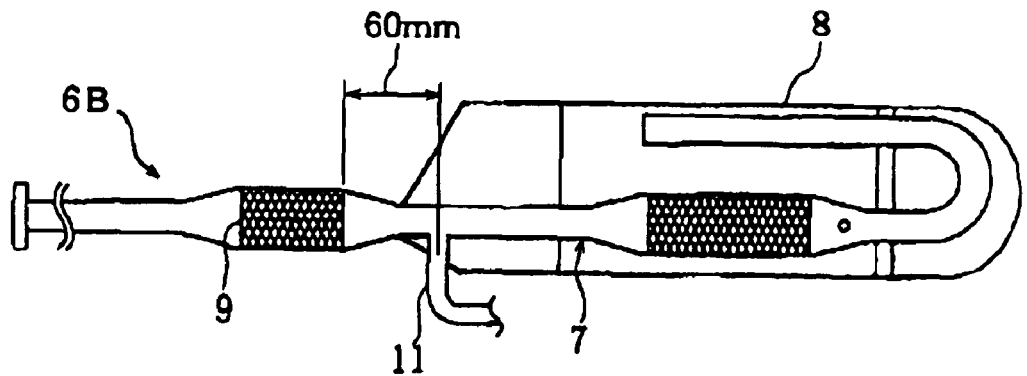
FIG. 9 is detailed view of another variation of the exhaust gas purifier shown in FIG. 6.
Figure 10:
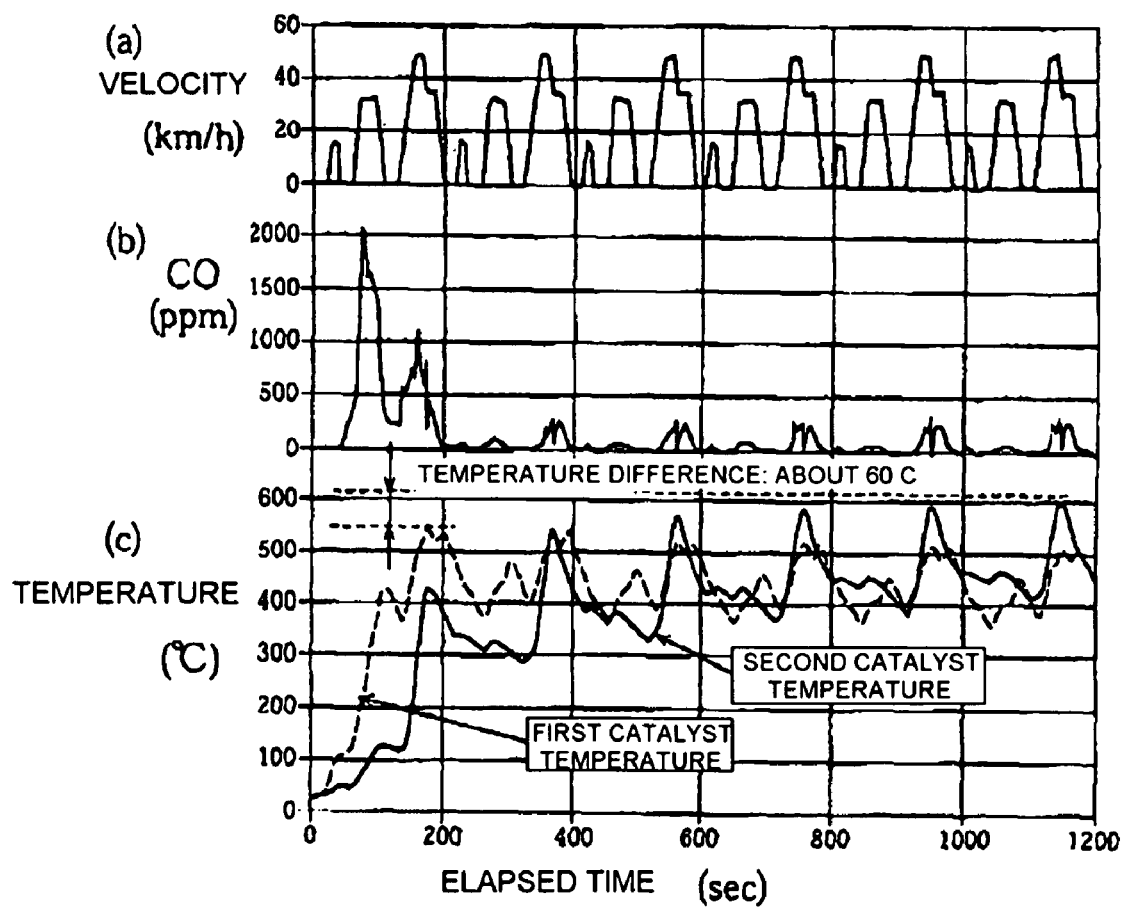
FIG. 10 is a diagram showing aspects of the performance of the exhaust gas purifier of FIG. 9.

With reference to FIG. 9, another embodiment of an exhaust gas purification system 6B introduces secondary air into the exhaust pipe 7 farther from the first catalyst 9 than in the embodiment of FIG. 7. In the system 6B, the secondary air induction pipe 11 is connected to the exhaust pipe 7 in a zone where the transverse size of the exhaust pipe 7 does not vary along its length, e.g., in a portion that is reduced in size to the diameter d2. In the system 6B, the secondary air induction pipe 11 is connected to the exhaust pipe 7 at a position about 60 mm downstream from the rear end surface of the fist catalyst 9. The position of the introduction of secondary air through the secondary air induction pipe 11 is inside the muffler 8, adjacent a forward end thereof in the embodiment illustrated by FIG. 9.

Figure 11:
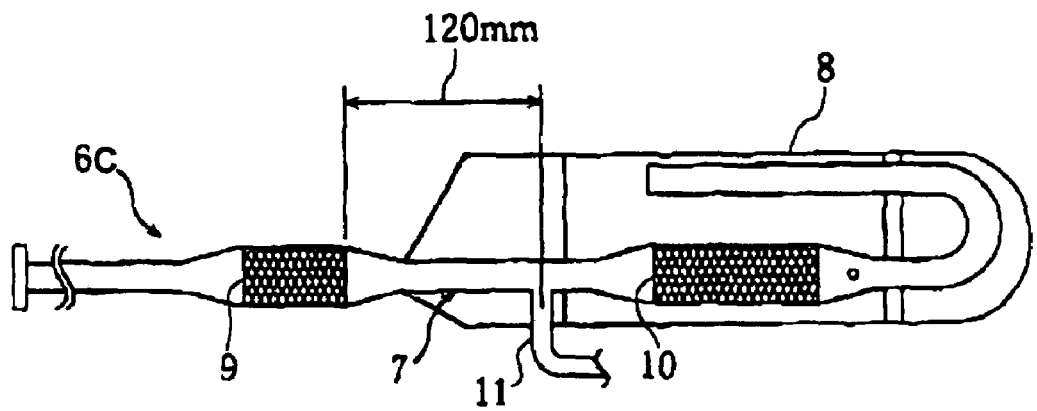
FIG. 11 is detailed view of another variation of the exhaust gas purifier shown in FIG. 6.
Figure 12:
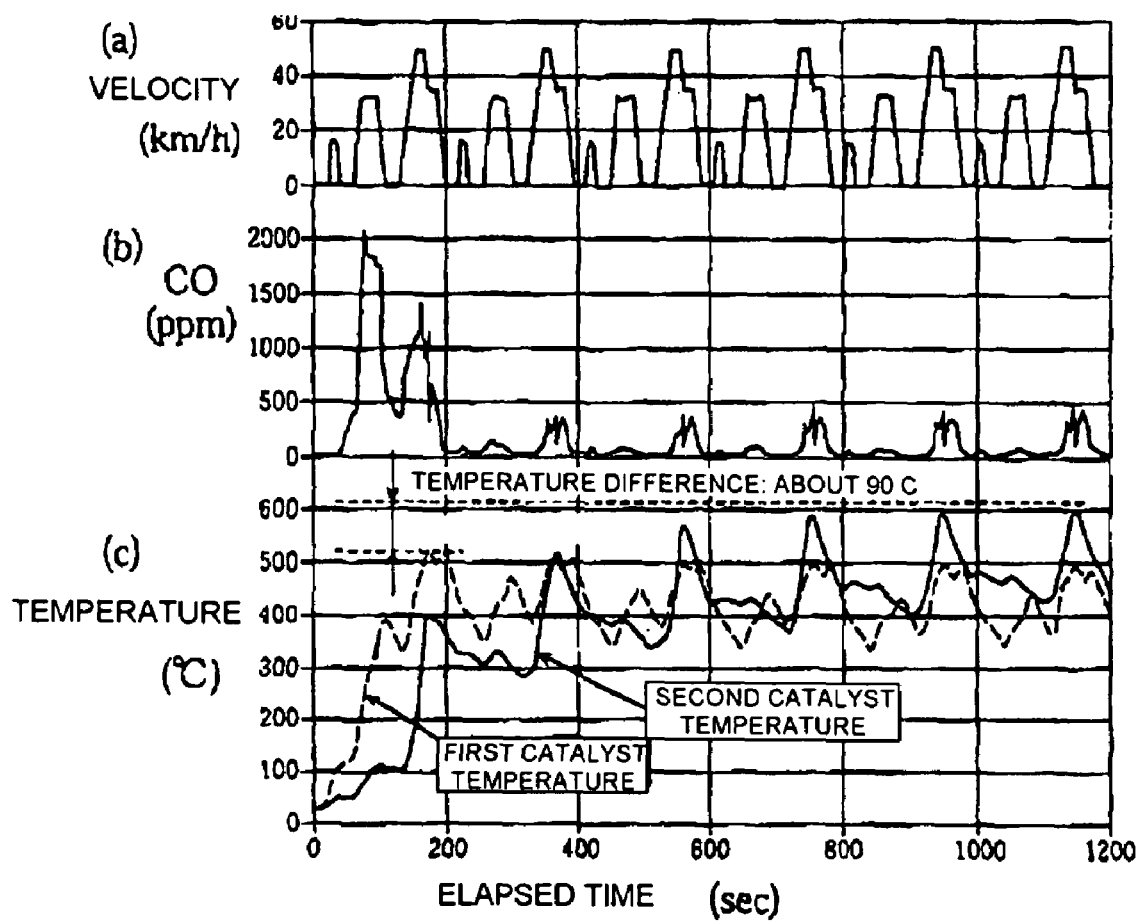
FIG. 12 is a diagram showing aspects of the performance of the exhaust gas purifier of FIG. 11.
Figure 13:
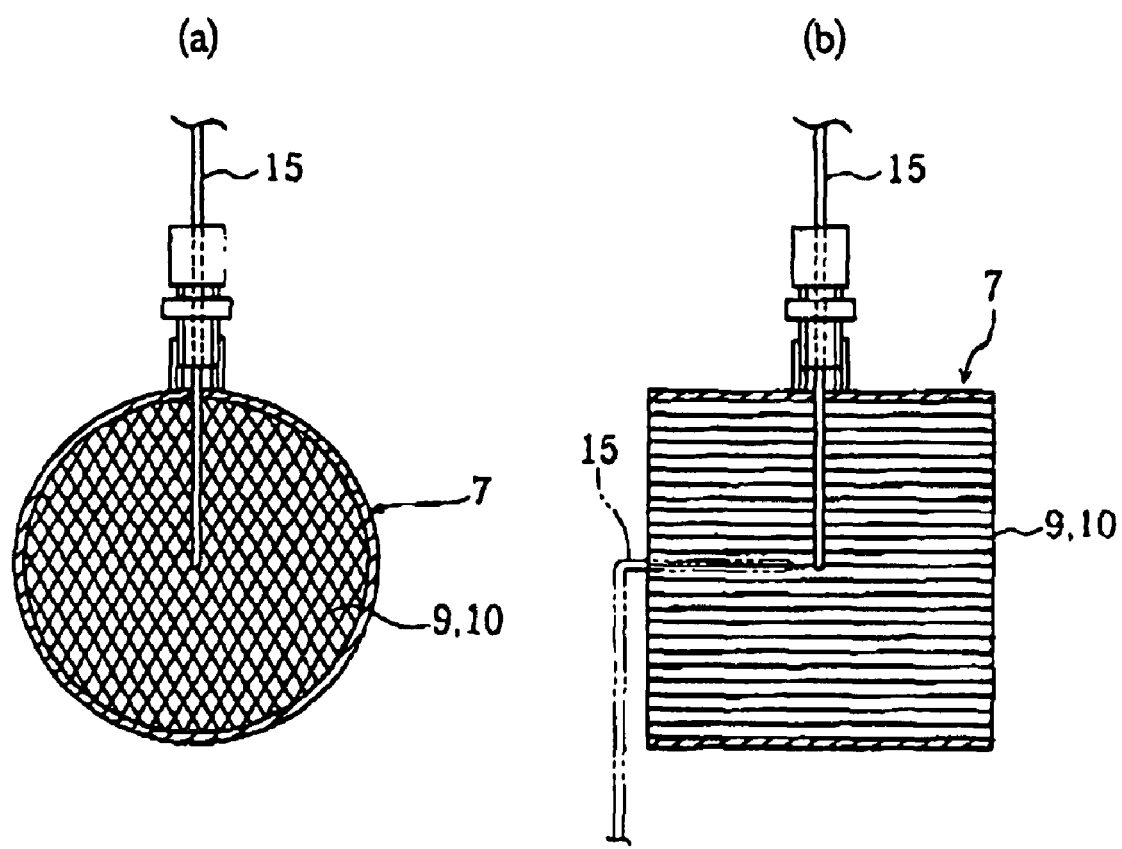
FIG. 13 is a diagram showing temperature measurement apparatuses and techniques for use with exhaust gas purifiers.

With reference to FIG. 11, another embodiment of an exhaust gas purification system 6C introduces secondary air into the exhaust pipe 7 farther from the first catalyst 9 than in the embodiment of FIG. 9. In the system 6C, the secondary air induction pipe 11 is connected to the exhaust pipe 7 in a zone where the transverse size of the exhaust pipe 7 does not vary along its length, e.g., in a portion that is reduced in size to the diameter d2. In the embodiment of FIG. 11, the secondary air induction pipe 11 is connected to the exhaust pipe 7 at a location in the muffler 8. In the embodiment of FIG. 11, the secondary air induction pipe 11 is connected to a position on the downstream side of the first catalyst 9, about 120 mm from the rear end surface thereof.

An experiment comparing the performance of the embodiments of FIGS. 7, 9, and 11 was conducted, as discussed above. During the experiment, a change in a temperature of each of the first and the second catalysts 9, 10 was measured, and an amount of CO emitted by each catalyst was measured. The capacity of each of the first and the second catalysts 9, 10 in the three embodiments was the same and each of the systems 6A, 6B, and 6C was connected to an engine with the same performance.

FIGS. 13(a) and 13(b) illustrate temperature measurement apparatuses and techniques for the first and second catalysts 9, 10 respectively in connection with the experiment. A hole of about 3 mm was opened in the exhaust pipe 7 and in the first and second catalysts 9, 10. A K-type thermo-couple 15 was inserted into the holes in each of the first and second catalysts 9, 10 and fixed in the holes such that a tip of the thermo-couple 15 was located in centers of the catalysts 9, 10. One technique provides an orientation of the thermocouple 15 that is a generally radial, e.g., perpendicular to the longitudinal axis of the exhaust pipe 7. Another technique provides an orientation of thermocouple 15 that is generally axial, e.g., parallel to the longitudinal axis of the pipe 7, as illustrated by alternate long and two short dash lines in FIG. 13(b).

For each of the embodiments illustrated in FIGS. 7, 9, and 11, the difference between the maximum temperatures of the first and the second catalysts 9, 10 was measured to be within an acceptable range, e.g., less than about 100° C. For example, the measured maximum temperature difference for the embodiment of FIG. 7 was about 20° C. The measured maximum temperature difference for the embodiment of FIG. 9 was about 60° C. The measured maximum temperature difference for the embodiment of FIG. 11 was about 90° C. Satisfactory values were measured of the amount of emission of CO for each of the systems 6A, 6B, and 6C. In some embodiments, it is desirable to maintain the maximum temperature difference between the catalysts 9, 10 within a fixed upper limit, e.g., 100° C. The foregoing test results show that the arrangement of the components of an exhaust gas purification system can be selected to provide adequate exhaust system performance while also extending the usable life thereof. For example, the positions of the first and the second catalysts 9 and 10 can be selected to provide acceptable entering gas temperature and catalyst activation time. Also, the connection position of the secondary air induction pipe 11 can be selected to control the temperature difference between the two catalysts. For example, the connection position can be selected to maintain the maximum temperature difference of the first and the second catalysts 9, 10 within an upper limit, such as 100° C. As discussed above, maintaining the maximum temperature difference within an upper limit can prevent or at least significantly delay deterioration of one or both of the catalysts.

Figure 14:
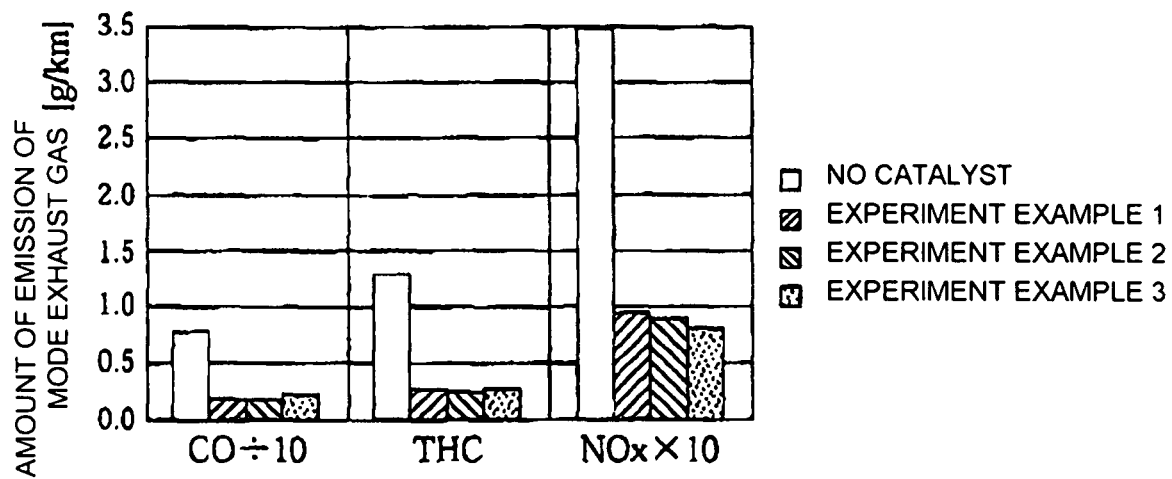
FIG. 14 compares the performance of the exhaust gas purifier embodiments of FIGS. 7, 9, and 11.

FIG. 14 compares the performance of the systems 6A, 6B, and 6C. The system 6A removed more CO from the exhaust gas than the system 6C. Accordingly, it appears that CO is more effectively removed when the secondary air induction pipe 11 is connected to the portion on the downstream side closest to the first catalyst 9. This may be because the secondary air was blown back from the downstream side of the first catalyst 9 to cause some oxidation reaction in the first catalyst, thereby enhancing removal of CO, e.g., while the engine initially started.

The performance of the first catalyst 9 in the system 6A and the system 6C after the catalysts has become sufficiently activated also is of interest. In the above experiment, the first and second catalysts 9, 10 can be considered activated after about 1000 seconds have elapsed. After sufficient activation, an emission level of CO from the system 6A is about 200 ppm (see FIG. 8(b)), which is smaller than that of about 400 ppm in the system 6C (see FIG. 12(b)). It appears that the position of the delivery of secondary air affects the removal of CO after the catalysts have become sufficiently activated. In particular, the capacities of the first and second catalysts 9, 10 are the same and the amount of secondary air delivered is the same in the systems 6A and 6C, but the position along the exhaust pipe 7 of the secondary air induction pipe 11 is different between these embodiments.

Referring again to FIG. 14, the mode exhaust gas values according to the systems 6A, 6B, and 6C are further discussed below. In the figure, compared with a case in which no catalyst is used, in results obtained in connection with the systems 6A, 6B, and 6C, a removal rate of CO and HC is high at about 75 to 80%, and a removal rate NOx is also high at 70 to 75%.

One objective in selecting the location of the secondary air induction pip 11 is to control a maximum temperature difference between the first and second catalysts 9, 10 to within a predetermined temperature range or to below a pre-selected upper limit (e.g., 100° C.). As discussed above, keeping the temperature different low prevents or significantly delays premature deterioration of the catalysts. Another objective is to improve or otherwise affect the performance of one or more of the first and second catalysts 9, 10. For example, the secondary air induction pipe 11 can be connected to the exhaust pipe 7 at a position where the introduced secondary air acts on the first catalyst 9 due to exhaust pulsation.

In one embodiment, the secondary air induction pipe 11 is connected to a portion of the exhaust pipe 7 on a downstream side of and near to the first catalyst 9, e.g., within a range of about 1/3 of the distance from the downstream side of the first catalyst 9 to the upstream side of the second catalyst 10. This arrangement permits a portion of the secondary air introduced into the exhaust pipe 7 to be drawn back from the downstream side of and into the first catalyst 9. This portion of secondary air, sometimes referred to herein as blown-back secondary air, enhances the oxidization of CO and HC in the first catalyst 9. The blown-back secondary air is particularly helpful when an engine with which the exhaust gas purification system is coupled is in a cold state. In the cold state, before the first catalyst 9 is fully activated, the first catalyst 9 is less effective in removing CO and HC. However, oxidation of CO and HC can be enhanced by the delivery of blown-back secondary air. Blown-back air can be delivered by exhaust pulsation. Purification of exhaust gas can be improved by the blown-back air, e.g., when the engine is cold, before the first catalyst 9 is fully activated. The enhanced performance of the first catalyst prior to full activation is illustrated by comparing the test results for the system 6A and the system 6C.

The embodiments are particularly usable in purifying exhaust gases in engines that are configured to run on a relatively rich A/F ratio. However, the embodiments also can be applicable to a four-cycle engines that detect oxygen concentration in exhaust gas and that provides feedback control of an amount of fuel injection to an engine such that an A/F ratio, which is controlled at least in part based on the oxygen concentration, is set as a target air fuel ratio. By connecting a secondary air induction pipe to a position where a difference between maximum temperatures of first and second catalysts is controlled, for example maintained within an suitable range such as below about 100° C., similar benefits can be obtained as in the embodiments described above.

Operation of the systems described herein will now be discussed more generally. In one embodiment, when the engine 1 is started in a cold state, a temperature of the first catalyst 9 arranged on the upstream side starts to rise. Thereafter, a temperature of the second catalyst 10 on the downstream side of the first catalyst 9 starts to rise. The temperature of the first catalyst 9 reaches a maximum temperature a short time after the engine 1 starts and then gradually falls to stabilize after a transient phase. The temperature of the second catalyst 10 gradually rises after the engine 1 starts and eventually stabilizes after a transient phase.

As discussed above, the position in the exhaust pipe 7 where the secondary air is introduced is set such that a difference between maximum temperatures of the first and second catalysts 9, 10 after the transient phase is within a predetermined temperature range or is below a predetermined upper limit. Thus, the temperature difference of the first and second catalysts 9, 10 can be retained in a predetermined range or below the predetermined upper limit. By reducing the temperature difference between the first and second catalysts 9, 10, the burden on the catalysts due to an excessive temperature difference can be controlled. For example, by reducing the temperature difference between the first and second catalysts 9, 10, the excessive burden on one or the other of the catalysts can be minimized, and as a result, deterioration of the catalysts can be controlled to extend a usable life thereof.

As the secondary air induction position is brought closer to the second catalyst 10, the temperature of the second catalyst is raised. In some cases, the temperature of the second catalyst 10 is raised by a larger degree. At the same time, the maximum temperature of the first catalyst 9 during the transient, start-up phase is reduced. As a result, the temperature difference between the first and the second catalysts 9, 10 increases. On the other hand, as the secondary air induction position is brought closer to the first catalyst 9, the maximum temperature of the first catalyst rises, at the same time, the temperature rise of the second catalyst is less, and as a result, the temperature difference of the first and the second catalysts decreases.

In another embodiment, the secondary air induction pipe 11 is connected to the exhaust pipe 7 at a position where the secondary air acts on the first catalyst due to exhaust pulsation. Thus, a part of the secondary air is blown back from the downstream side of the first catalyst 9, and CO and HC are oxidized by the blown-back secondary air in the first catalyst. When the engine is in the cold state, oxidation of CO and HC can be performed by the blown-back secondary air by the exhaust pulsation in the first catalyst, activation of the first catalyst can be facilitated, and purification performance for exhaust gas at the engine cold start time can be improved.

In another embodiment, at least a portion of the second catalyst 10 is disposed inside the muffler 8 for the exhaust pipe 7. As discussed above, by housing at least a portion of the second catalyst 10 in the muffler 8, the capacity of the catalyst can be increased, e.g., by making it larger. This improves the performance of the purification systems without spoiling an appearance of the exhaust pipe 7.

In addition, when the second catalyst 10 is disposed in the muffler, the exhaust pipe 7 where the second catalyst is disposed is generally shielded from external air and thus is not cooled by the external air. This reduces the time until the second catalyst 10 reaches the activation temperature, which also increases the performance.

In another embodiment, the secondary air induction pipe 11 is connected to a portion of the exhaust pipe 7 that is inside the muffler 8. This arrangement enables the secondary air induction pipe 11 to be supported by the exhaust pipe 7 and the muffler 8. This arrangement allows the connection of the secondary air induction pipe 11 to be improved without spoiling the appearance of the vehicle.

Although this invention has been disclosed in the context of a certain preferred embodiments and examples, it will be understood by those skilled in the art that the present invention extends beyond the specifically disclosed embodiments to other alternative embodiments and/or uses of the invention and obvious modifications and equivalents thereof. In addition, while a number of variations of the invention have been shown and described in detail, other modifications, which are within the scope of this invention, will be readily apparent to those of skill in the art based upon this disclosure. It is also contemplated that various combinations or sub-combinations of the specific features and aspects of the embodiments may be made and still fall within the scope of the invention. Accordingly, it should be understood that various features and aspects of the disclosed embodiments can be combine with or substituted for one another in order to form varying modes of the disclosed invention. Thus, it is intended that the scope of the present invention herein disclosed should not be limited by the particular disclosed embodiments described above, but should be determined only by a fair reading of the claims.

What is claimed is:

1. An engine system, comprising:
an exhaust port for releasing combusted gas from an engine;
an exhaust system comprising:
an exhaust pipe coupled with the exhaust port, the exhaust pipe comprising a first location having a first cross-sectional area, a second location having a second cross-sectional area, and a third location having a third cross-sectional area;
a first catalyst disposed at the first location in the exhaust pipe, the first catalyst configured to provide a reduction action;
a second catalyst disposed at the second location in the exhaust pipe a set distance downstream of the first catalyst, the second catalyst configured to provide an oxidation action;
a secondary air induction pipe for introducing air into the exhaust pipe at the third location, the secondary air induction pipe being connected to the exhaust pipe between the first and the second catalysts at a location where the secondary air induction pipe is in fluid communication with the first catalyst and a temperature difference between the first and the second catalysts in a cold start transient phase is within a predetermined range; and
a muffler that surrounds a portion of the exhaust pipe, wherein the first catalyst is disposed upstream of the muffler, and the second catalyst is disposed inside the muffler;
wherein the third cross-sectional area is less than at least one of the first and the second cross-sectional areas.

2. The engine system of claim 1, wherein the cold start transient phase extends form an engine cold start until a predetermined operation time elapses.

3. The engine system of claim 1, wherein the secondary air induction pipe is connected to the exhaust pipe at a location where the flow velocity of the exhaust gas in the exhaust pipe is increased.

4. The engine system of claim 1, further comprising a flow regulator associated with the secondary air induction pipe to control the flow of secondary air therein.

5. The engine system of claim 1, wherein the engine has a displacement of about 50 cubic centimeters, the first catalyst is located within about 500 mm from the exhaust port, the second catalyst is located about 200 mm from the first catalyst, and the secondary air induction pipe is connected to the exhaust pipe within about 120 mm of the first catalyst.

6. The engine system of claim 1, wherein the secondary air induction pipe is connected to a part of the exhaust pipe outside the muffler.

7. The engine system of claim 1, further comprising a four-cycle engine comprising said exhaust port.

8. The engine system of claim 1, wherein the exhaust pipe comprises an upstream portion and a downstream portion, the downstream portion comprising a U-shaped construction.

9. The engine system of claim 8, wherein the first catalyst is situated in the upstream portion and the second catalyst is situated in the downstream portion.

10. The engine system of claim 1, wherein the exhaust pipe comprises an enlarged portion and a constricted portion wherein the flow velocity of exhaust gas increases.

11. The engine system of claim 10, wherein the constricted portion of the exhaust pipe is between the first and second catalysts.

12. The engine system of claim 10, wherein at least one of the first and second catalysts is located in the enlarged portion of the exhaust pipe.

13. The engine system of claim 10, wherein the enlarged portion includes a first section and a second section and wherein the constricted portion is located between the first and second sections of the enlarged portion.

14. The engine system of claim 10, wherein the secondary air induction pipe is connected to the constricted portion of the exhaust pipe.

15. An engine system, comprising:
an exhaust port for releasing combusted gas from an engine;
an exhaust system comprising:
an exhaust pipe coupled with the exhaust port, the exhaust pipe comprising a first location having a first cross-sectional area, a second location having a second cross-sectional area, and a third location having a third cross-sectional area;
a first catalyst disposed at the first location in the exhaust pipe, the first catalyst configured to provide a reduction action;
a second catalyst disposed at the second location in the exhaust pipe a set distance downstream of the first catalyst, the second catalyst configured to provide an oxidation action;
a secondary air induction pipe for introducing air into the exhaust pipe at the third location, the secondary air induction pipe being connected to the exhaust pipe between the first and the second catalysts at a location where the secondary air induction pipe is in fluid communication with the first catalyst and a temperature difference between the first and the second catalysts in a cold start transient phase is within a predetermined range; and
a muffler that surrounds a portion of the exhaust pipe, the muffler being disposed downstream of the first catalyst, and the second catalyst being disposed inside the muffler, wherein the secondary air induction pipe is connected to a part of the exhaust pipe inside the muffler;
wherein the third cross-sectional area is less than at least one of the first and the second cross-sectional areas.

16. An engine system, comprising:
an exhaust port for releasing combusted gas from an engine;
an exhaust system comprising:
an exhaust pipe coupled with the exhaust port, the exhaust pipe comprising a first location having a first cross-sectional area, a second location having a second cross-sectional area, and a third location having a third cross-sectional area;
a first catalyst disposed at the first location in the exhaust pipe, the first catalyst configured to provide a reduction action;
a second catalyst disposed at the second location in the exhaust pipe a set distance downstream of the first catalyst, the second catalyst configured to provide an oxidation action;
a secondary air induction pipe for introducing air into the exhaust pipe at the third location, the secondary air induction pipe being connected to the exhaust pipe between the first and the second catalysts at a location where the secondary air induction pipe is in fluid communication with the first catalyst and a temperature difference between the first and the second catalysts in a cold start transient phase is within a predetermined range;

wherein the exhaust pipe comprises an enlarged portion and a constricted portion wherein the flow velocity of exhaust gas increases;

wherein the third cross-sectional area is less than at least one of the first and the second cross-sectional areas; and wherein the secondary air induction pipe is connected to the enlarged portion of the exhaust pipe downstream of the first catalyst.

17. An engine system, comprising:

an exhaust port for releasing combusted gas from an engine;

an exhaust system comprising:

an exhaust pipe coupled with the exhaust port, the exhaust pipe comprising a first location having a first cross-sectional area, a second location having a second cross-sectional area, and a third location having a third cross-sectional area;

a first catalyst disposed at the first location in the exhaust pipe, the first catalyst configured to provide a reduction action;

a second catalyst disposed at the second location in the exhaust pipe a set distance downstream of the first catalyst, the second catalyst configured to provide an oxidation action;

a secondary air induction pipe for introducing air into the exhaust pipe at the third location, the secondary air induction pipe being connected to the exhaust pipe between the first and the second catalysts at a location where the secondary air induction pipe is in fluid communication with the first catalyst and a temperature difference between the first and the second catalysts in a cold start transient phase is within a predetermined range; and wherein the exhaust pipe comprises an enlarged portion and a constricted portion wherein the flow velocity of exhaust gas increases;

wherein the third cross-sectional area is less than at least one of the first and the second cross-sectional areas; and wherein exhaust pipe includes a longitudinal axis and a transition portion having a transverse size that varies along the longitudinal axis, the transition portion located between the enlarged portion and the constricted portion, wherein the secondary air induction pipe is connected to the transition portion.

18. An engine system, comprising:

an exhaust port for releasing combusted gas from an engine;

an exhaust system comprising:

an exhaust pipe coupled with the exhaust port, the exhaust pipe comprising a first location having a first cross-sectional area, a second location having a second cross-sectional area, and a third location having a third cross-sectional area;

a first catalyst disposed at the first location in the exhaust pipe, the first catalyst configured to provide a reduction action;

a second catalyst disposed at the second location in the exhaust pipe a set distance downstream of the first catalyst, the second catalyst configured to provide an oxidation action;

a secondary air induction pipe for introducing air into the exhaust pipe at the third location, the secondary air induction pipe being connected to the exhaust pipe between the first and the second catalysts at a location where the secondary air induction pipe is in fluid communication with the first catalyst and a temperature difference between the first and the second catalysts in a cold start transient phase is within a predetermined range;

wherein the third cross-sectional area is less than at least one of the first and the second cross-sectional areas; and wherein the temperature difference between the first and second catalyst is within about 100 degrees Celsius.

19. An engine system, comprising:

an exhaust port for releasing combusted gas from an engine;

an exhaust system guiding exhaust pulsations, comprising:

an exhaust pipe coupled to the exhaust port, the exhaust pipe comprising a first location having a first cross-sectional area, a second location having a second cross-sectional area, and a third location having a third cross-sectional area;

a first catalyst arranged at the first location in the exhaust pipe, the first catalyst configured to provide a reduction action;

a second catalyst arranged at the second location in the exhaust pipe a set distance downstream of the first catalyst, the second catalyst configured to provide an oxidation action;

a secondary air induction pipe for introducing the secondary air into the exhaust pipe at the third location, the secondary air induction pipe being connected to the exhaust pipe between the first and the second catalysts at a position where the secondary air induction pipe is in fluid communication with the first catalyst and the secondary air acts on the first catalyst due to the exhaust pulsation; and a muffler that surrounds a portion of the exhaust pipe, wherein the first catalyst is disposed upstream of the muffler, and the second catalyst is disposed inside the muffler;

wherein the third cross-sectional area is less than at least one of the first and the second cross-sectional areas.

20. The engine system of claim 19, further comprising a four-cycle engine comprising said exhaust port.

21. An engine system, comprising:

an exhaust port for releasing combusted gas from an engine;

an exhaust system guiding exhaust pulsations, comprising:

an exhaust pipe coupled to the exhaust port, the exhaust pipe comprising a first location having a first cross-sectional area, a second location having a second cross-sectional area, and a third location having a third cross-sectional area;

a first catalyst arranged at the first location in the exhaust pipe, the first catalyst configured to provide a reduction action;

a second catalyst arranged at the second location in the exhaust pipe a set distance downstream of the first catalyst, the second catalyst configured to provide an oxidation action;

a secondary air induction pipe for introducing the secondary air into the exhaust pipe at the third location, the secondary air induction pipe being connected to the exhaust pipe between the first and the second catalysts at a position where the secondary air induction pipe is in fluid communication with the first catalyst and the secondary air acts on the first catalyst due to the exhaust pulsation; and a muffler that surrounds a portion of the exhaust pipe, the muffler being disposed downstream of the first catalyst, and the second catalyst being disposed inside the muffler, wherein the secondary air induction pipe is connected to a part of the exhaust pipe inside the muffler.

22. An engine system, comprising:

an exhaust port for releasing combusted gas from an engine;

an exhaust system comprising:

an exhaust pipe comprising a secondary air induction port and being coupled with the exhaust pipe;

a first catalyst disposed in the exhaust pipe;

a second catalyst disposed in the exhaust pipe a set distance downstream of the first catalyst; and a secondary air induction pipe coupled with the exhaust pipe at the secondary air induction port, the secondary air induction pipe being configure for introducing air into the exhaust pipe;

wherein the secondary air induction port is positioned between the first and second catalysts and air delivered therethrough causes the first and second catalysts to be heated during a cold start transient phase such that the temperature difference between the first and the second catalysts is less than about 100° C.

23. The engine system of claim 22, wherein the secondary air induction pipe is connected to the exhaust pipe between a constriction in the exhaust pipe and the first catalyst.

24. The engine system of claim 22, wherein the secondary air induction pipe is connected to the exhaust pipe at a location that is closer in the flow path to the first catalyst than to the second catalyst.

25. The engine system of claim 22, wherein the secondary air induction pipe is connected to the exhaust pipe at a location that is closer in the flow path to the second catalyst than to the first catalyst.

26. The engine system of claim 22, wherein the first catalyst is configured to provide a reduction action and the second catalyst is configured to provide an oxidation action.

27. The engine system of claim 22, further comprising a muffler that surrounds a portion of the exhaust pipe, wherein the first catalyst is disposed upstream of the muffler, and the second catalyst is disposed inside the muffler.

28. The engine system of claim 22, wherein the secondary air induction port is positioned such that at least some air delivered therethrough enters the first catalyst.

* * * * *

UNITED STATES PATENT AND TRADEMARK OFFICE
CERTIFICATE OF CORRECTION

PATENT NO.        : 7,448,204 B2
APPLICATION NO.  : 11/311067
DATED             : November 11, 2008
INVENTOR(S)       : Hidehiro Nishimura, Junichi Ooba and Osamu Takii It is certified that error appears in the above-identified patent and that said Letters Patent is hereby corrected as shown below:

Col. 3, line 48, after "first" please delete "catalysts".

Col. 8, line 56, please change "Vehicle" to --vehicle--.

Col. 9, line 2, please change "FIG." to --FIGS.--.

Col. 16, line 7, In Claim 18, please change "catalyst" to --catalysts--.

Signed and Sealed this

Fourteenth Day of April, 2009

JOHN DOLL
*Acting Director of the United States Patent and Trademark Office*